(12) United States Patent
Sumiya (10) Patent No.: US 11,913,265 B2
(45) Date of Patent: Feb. 27, 2024

(54) VEHICULAR DOOR DEVICE

(71) Applicant: AISIN CORPORATION, Kariya (JP)

(72) Inventor: Seiichi Sumiya, Kariya (JP)

(73) Assignee: AISIN CORPORATION, Kariya (JP)

( * ) Notice: Subject to any disclaimer, the term of this patent is extended or adjusted under 35 U.S.C. 154(b) by 259 days.

(21) Appl. No.: 17/457,288

(22) Filed: Dec. 2, 2021

(65) Prior Publication Data

US 2022/0205293 A1  Jun. 30, 2022

(30) Foreign Application Priority Data

Dec. 25, 2020  (JP) ................... 2020-216684

(51) Int. Cl.
| | |
|---|---|
| *E05C 17/50* | (2006.01) |
| *E05C 17/00* | (2006.01) |
| *E05C 17/04* | (2006.01) |
| *E05C 17/34* | (2006.01) |
| *E05D 15/10* | (2006.01) |
| *B60J 5/06* | (2006.01) |

(52) U.S. Cl.
CPC ............ *E05C 17/50* (2013.01); *E05C 17/025* (2013.01); *E05C 17/045* (2013.01); *E05C 17/34* (2013.01); *E05D 15/101* (2013.01); *B60J 5/06* (2013.01); *E05Y 2900/531* (2013.01)

(58) Field of Classification Search
CPC ........ E05C 17/045; E05C 17/34; E05C 17/12; E05C 17/16; E05C 17/163; E05C 17/20; E05C 17/203; E05C 17/206; E05C 17/22; E05C 17/24; E05C 17/26; E05C 17/28; E05C 17/50; E05C 17/025; E05D 15/28; E05D 15/101; B60J 5/06; E05F 5/02; E05F 5/022; E05F 5/025; E05F 5/06
See application file for complete search history.

(56) References Cited

U.S. PATENT DOCUMENTS

| | | | | |
|---|---|---|---|---|
| 4,691,958 A | * | 9/1987 | Miller ..................... | E05C 17/50 292/262 |
| 5,862,570 A | * | 1/1999 | Lezuch ................. | E05C 17/203 292/262 |
| 6,058,563 A | * | 5/2000 | Bucknell ............... | E05C 19/004 292/297 |

(Continued)

FOREIGN PATENT DOCUMENTS

JP     2007-239339 A     9/2007

*Primary Examiner* — Jeffrey O'Brien
(74) *Attorney, Agent, or Firm* — Oblon, McClelland, Maier & Neustadt, L.L.P.

(57) ABSTRACT

A vehicular door device includes an inclinable lever provided at an open-side end portion of a door opening being opened and closed by a door, based on an operation of a link mechanism formed of first and second link arms, a biasing member that biases the inclinable lever and holds the inclinable lever in an erect state, and a check mechanism that engages with the inclinable lever in the erect state by movement of the door to a full opened position, and holds the door at the full opened position. The first link arm is provided at a position close to the open-side end portion of the door opening by an opening operation of the door, and the check mechanism is provided integrally with the first link arm. Then, the inclinable lever is stored in a clearance between the door and the open-side end portion of the door opening.

4 Claims, 8 Drawing Sheets

(56) References Cited

U.S. PATENT DOCUMENTS

| | | | | |
|---|---|---|---|---|
| 6,357,078 | B1* | 3/2002 | Marzolf | E05C 17/50 292/341.15 |
| 7,731,262 | B2* | 6/2010 | Shoemaker | F16F 9/0418 296/76 |
| 8,919,858 | B2* | 12/2014 | Lee | E05C 17/20 296/146.1 |
| 10,267,073 | B2* | 4/2019 | Reichlyn | E05C 17/12 |
| 2013/0019433 | A1* | 1/2013 | Perche | E05C 17/206 16/82 |
| 2019/0226249 | A1* | 7/2019 | Zammert | E05C 17/203 |

* cited by examiner

VEHICULAR DOOR DEVICE

CROSS REFERENCE TO RELATED APPLICATIONS

This application is based on and claims priority under 35 U.S.C. § 119 to Japanese Patent Application 2020-216684, filed on Dec. 25, 2020, the entire content of which is incorporated herein by reference.

TECHNICAL FIELD

This disclosure generally relates to a vehicular door device.

BACKGROUND DISCUSSION

There has conventionally been a vehicular door device including a first link arm and a second link arm that include a first rotary coupling point with respect to a vehicle body, and a second rotary coupling point with respect to a door of a vehicle. In such a vehicular door device, the door provided on a door opening performs an opening-closing operation, based on an operation of a link mechanism formed of the first link arm and the second link arm. Moreover, for example, a vehicular door device described in JP2007-239339A (Reference 1) includes a check arm that rotates integrally with a link arm around a first rotary coupling point with respect to a vehicle body. Further, in the check arm, an engagement portion having a ball-shaped outer shape engages with a check groove holding portion provided in the vehicle body, by movement of a door of a vehicle to a full opened position due to rotating of the check arm. Then, this results in a configuration in which the door of the vehicle is held at the full opened position, based on biasing force of a resilient member that pushes the engagement portion against the check groove holding portion.

However, in the configuration of the conventional technique described above, there needs a space in which the check arm rotates in conjunction with the link arm. Thus, there is a problem that the space causes a restriction on installation in the vehicle.

A need thus exists for a vehicular door device which is not susceptible to the drawback mentioned above.

SUMMARY

A vehicular door device that solves the problem described above includes first and second link arms, an inclinable lever, a biasing member, and a check mechanism. The first and second link arms include a first rotary coupling point with respect to a vehicle body, and a second rotary coupling point with respect to a door of a vehicle. The inclinable lever is provided at an open-side end portion of a door opening opened and closed by the door, based on an operation of a link mechanism formed of the first and second link arms. The biasing member biases the inclinable lever, and holds the inclinable lever in an erect state. The check mechanism engages with the inclinable lever in the erect state by movement of the door to a full opened position, and holds the door at the full opened position. The first link arm is provided at a position close to the open-side end portion of the door opening by an opening operation performed by the door. The check mechanism is provided in the first link arm, and the inclinable lever is stored in a clearance between the door and the open-side end portion of the door opening by being pressed by the door moving to a full closed position, and inclined.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, one embodiment of a vehicular door device is described with reference to the drawings.

Figure 1:
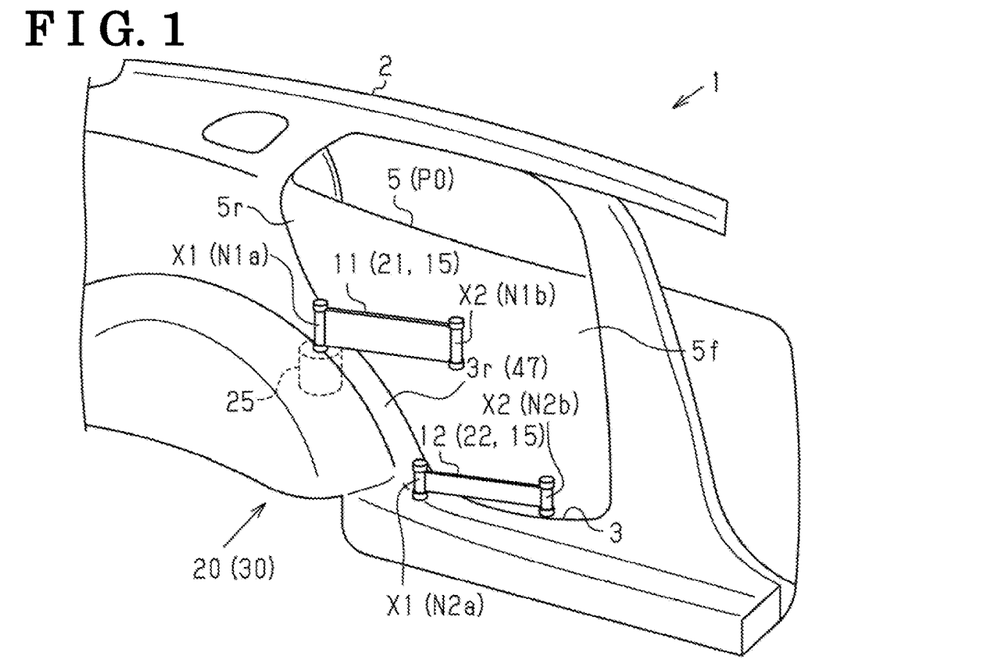
FIG. 1 is a perspective view of a vehicular door device.
Figure 2:
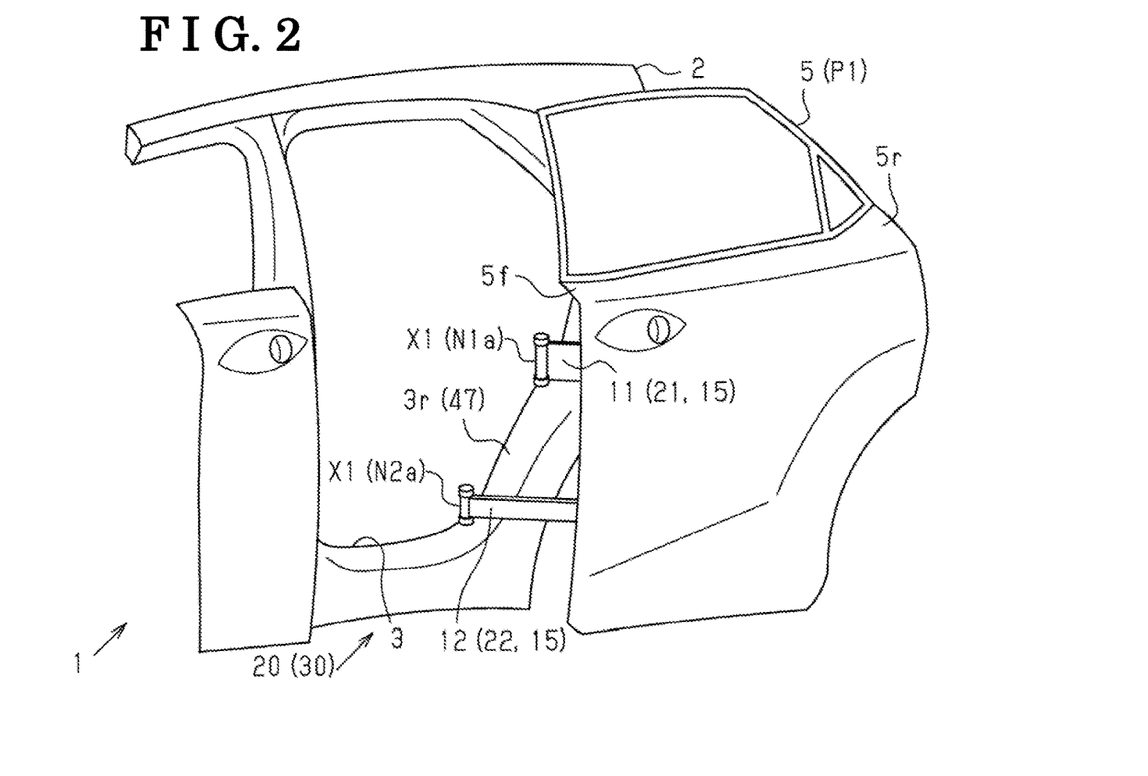
FIG. 2 is a perspective view of the vehicular door device.

As illustrated in FIGS. 1 and 2, a vehicle 1 according to the present embodiment includes a door opening 3 provided in a side surface of a vehicle body 2. Then, the door opening 3 is provided with a first link arm 11 and a second link arm 12 that support a door 5 of the vehicle 1 in the door opening 3.

To describe specifically, in the vehicle 1 according to the present embodiment, the first and second link arms 11 and 12 each include a first rotary coupling point X1 with respect to the vehicle body 2, and a second rotary coupling point X2 with respect to the door 5. To be specific, the first link arm 11 is coupled to the vehicle body 2 in a state of being pivotally supported by a support shaft N1a extending in an up-down direction (in each view, an up-down direction), and coupled to the door 5 in a state of being pivotally supported by a support shaft N1b extending in the up-down direction. Then, the second link arm 12 is also coupled to the vehicle body 2 in a state of being pivotally supported by a support shaft N2a extending in the up-down direction, and coupled to the door 5 in a state of being pivotally supported by a support shaft N2b extending in the up-down direction.

Figure 3:
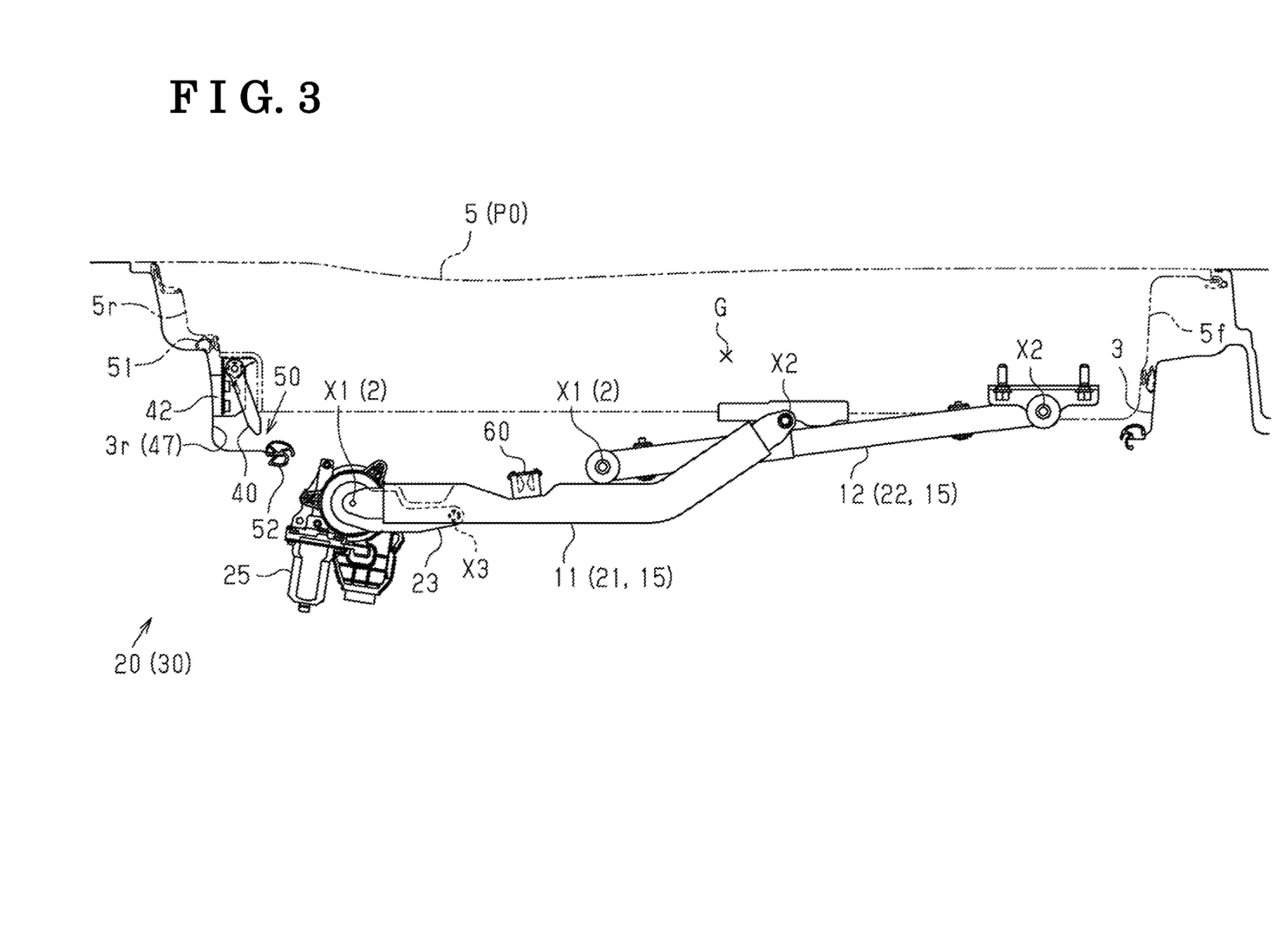
FIG. 3 is a plan view of first and second link arms forming a link mechanism.
Figure 4:
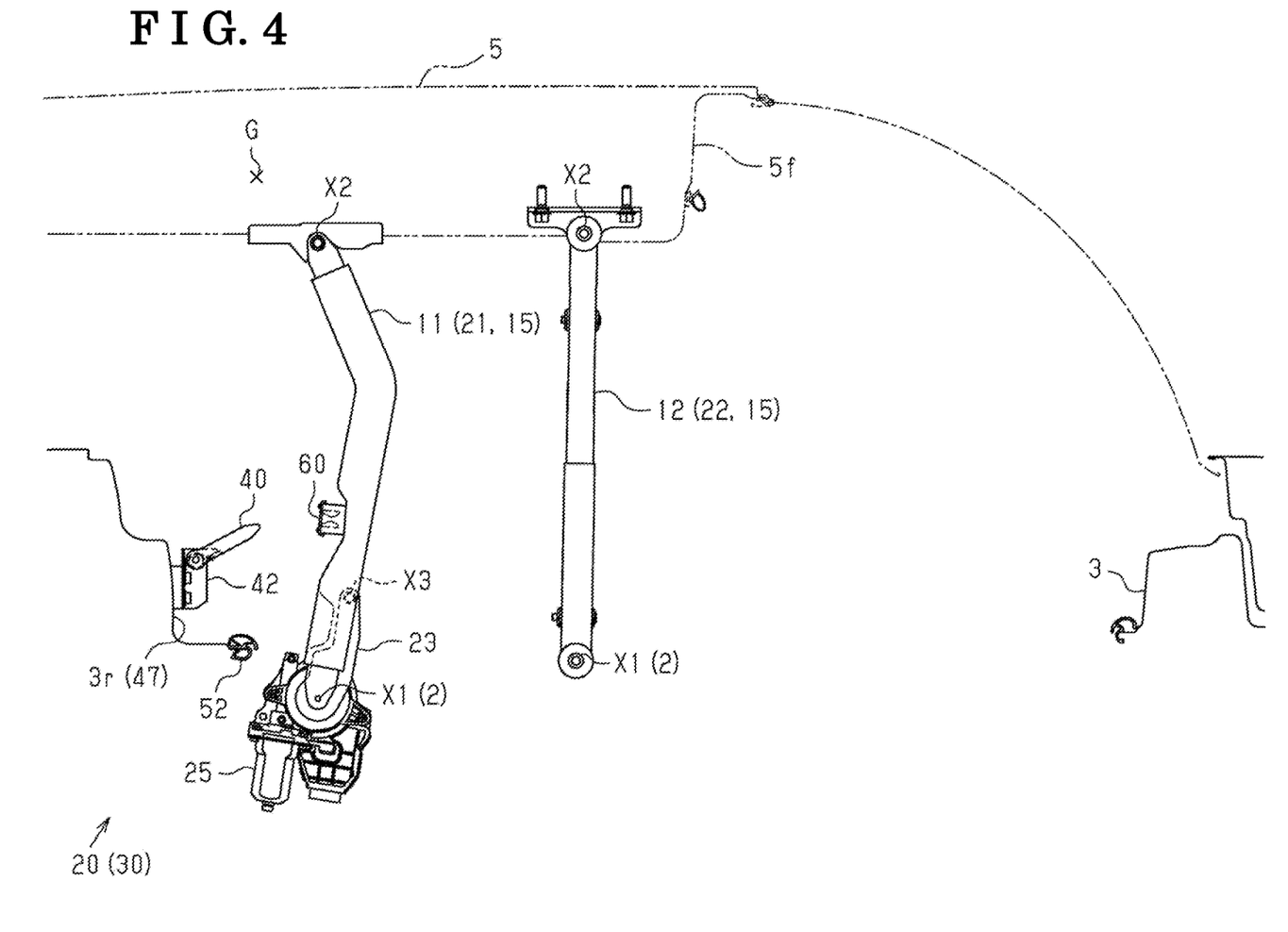
FIG. 4 is a plan view of the first and second link arms forming the link mechanism.
Figure 5:
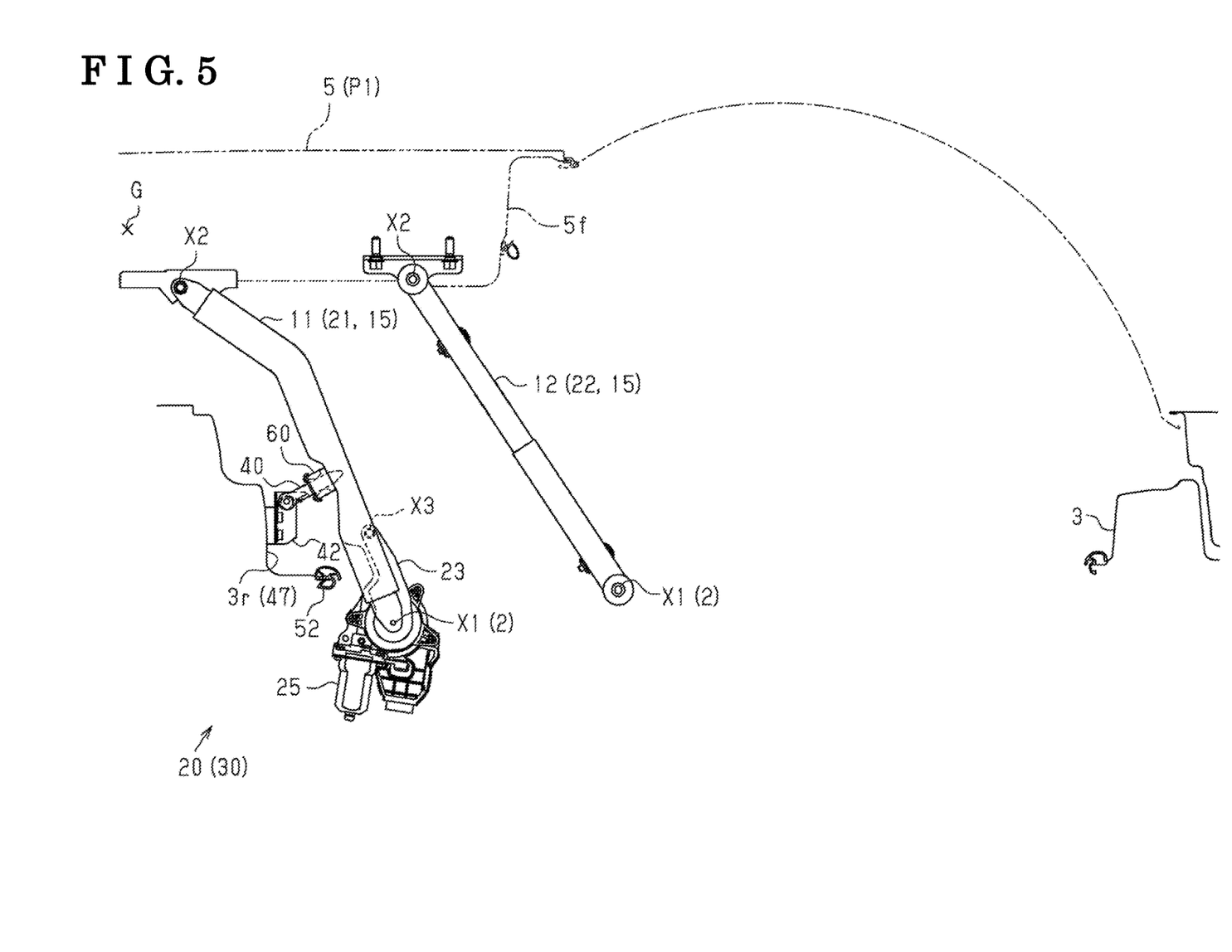
FIG. 5 is a plan view of the first and second link arms forming the link mechanism.

That is to say, as illustrated in FIGS. 3 to 5, in the vehicle 1 according to the present embodiment, the first and second link arms 11 and 12 form a link mechanism 15 having a configuration as a four-bar link. Then, the vehicle 1 according to the present embodiment has a configuration in which the door 5 supported in the door opening 3 performs an opening-closing operation, based on an operation of the link mechanism 15.

To describe more specifically, as illustrated in FIGS. 1 and 2, the vehicle 1 according to the present embodiment supports the door 5 in the door opening 3 on a vehicle rear side (in FIG. 1, a left side, and in FIG. 2, a right side) by use of the first and second link arms 11 and 12. In the vehicle 1 according to the present embodiment, the first and second link arms 11 and 12 each include, at a rear edge 3r of the door opening 3, the first rotary coupling point X1 coupled pivotally with respect to the vehicle body 2. Moreover, in the vehicle 1 according to the present embodiment, the first link arm 11 is provided higher than the second link arm 12. Further, the first link arm 11 includes, at a substantially central position in a front-rear direction of the door 5, the second rotary coupling point X2 coupled pivotally with respect to the door 5, and the second link arm 12 includes, in the vicinity of a front end 5f of the door 5, the second rotary coupling point X2 coupled to the door 5. Then, in the vehicle 1 according to the present embodiment, a vehicular door device 20 is thereby formed such that the door 5 performs an opening-closing operation, based on an operation of the link mechanism 15 formed of the first and second link arms 11 and 12.

To be specific, as illustrated in FIGS. 3 to 5, in the vehicular door device 20 according to the present embodiment, the first and second link arms 11 and 12 rotate around the first rotary coupling point X1 in a counterclockwise direction in each view, and thereby the door 5 of the vehicle 1 supported by the first and second link arms 11 and 12 performs an opening operation to the vehicle rear side (in each diagram, a left side). Then, the first and second link arms 11 and 12 are configured to rotate around the first rotary coupling point X1 in a clockwise direction in each view, and thereby the door 5 of the vehicle 1 supported by the first and second link arms 11 and 12 performs an opening operation to the vehicle front side (in each diagram, a right side).

Moreover, in the vehicular door device 20 according to the present embodiment, an opening-closing operation track of the door 5 is defined based on an operation of the link mechanism 15 formed of the first and second link arms 11 and 12. That is to say, as illustrated in FIG. 4, a movement component in a vehicle front-rear direction becomes great at an intermediate position where the first and second link arms 11 and 12 are in a state of extending in a vehicle width direction (in FIGS. 3 to 5, an up-down direction). Then, as illustrated in FIG. 3, the nearer an opening-closing operation position of the door 5 is to a full closed position P0, the more the first and second link arms 11 and 12 are in a state of extending in a vehicle front-rear direction (in FIGS. 3 to 5, an left-right direction), and thereby a movement component in the vehicle width direction becomes great.

Furthermore, as illustrated in FIGS. 1 to 5, in the vehicular door device 20 according to the present embodiment, the first link arm 11 has the second rotary coupling point X2 coupled to the door 5 at a position nearer a center of gravity G than the second link arm 12. Then, the vehicular door device 20 according to the present embodiment is thereby configured in such a way that, regarding a support function of supporting a load of the door 5, the first link arm 11 serves as a main link 21 supporting a greater door load, and the second link arm 12 serves as a sub link 22 whose acting door load is relatively small.

Note that, in the vehicular door device 20 according to the present embodiment, the first link arm 11 has a larger diameter than the second link arm 12. Then, the vehicular door device 20 thereby has a configuration in which high support rigidity is applied to the first link arm 11 positioned by the main link 21.

Figure 6:
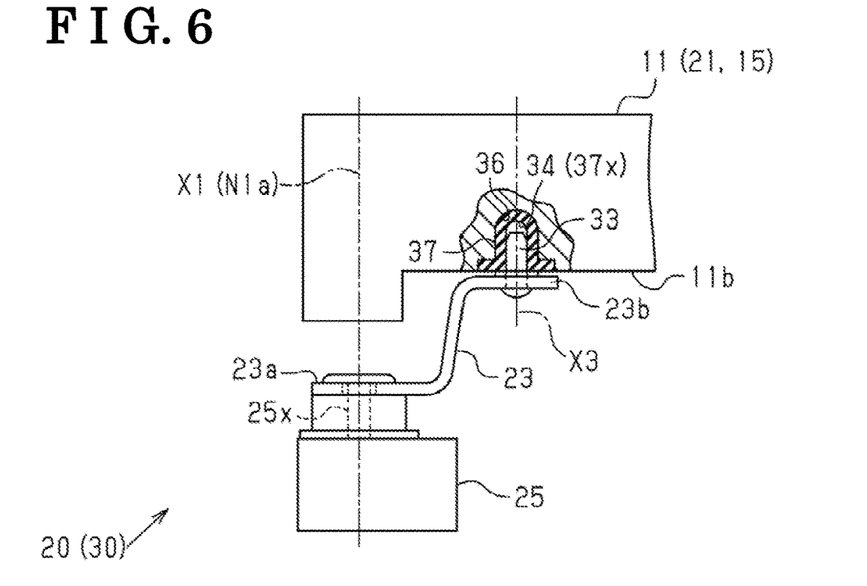
FIG. 6 is a side view of a drive arm and an actuator coupled to the first link arm.
Figure 7:
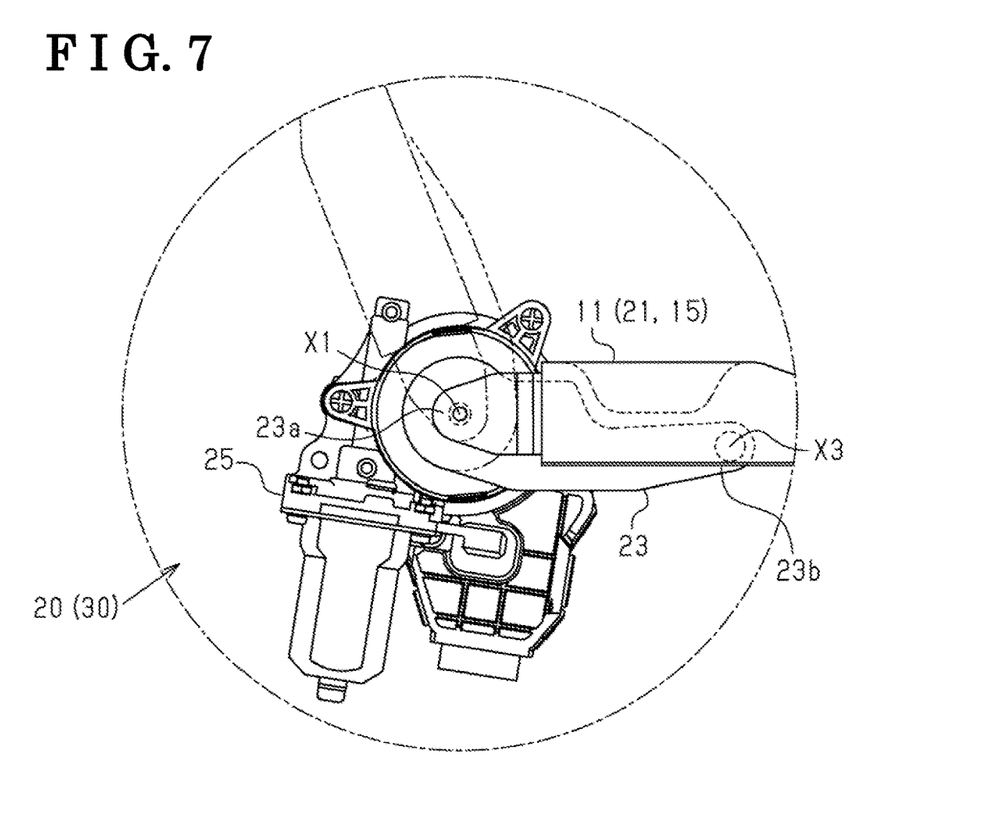
FIG. 7 is a plan view of the drive arm and the actuator coupled to the first link arm.

Moreover, as illustrated in FIGS. 6 and 7, the vehicular door device 20 according to the present embodiment includes, at a position between the first rotary coupling point X1 and the second rotary coupling point X2, a drive arm 23 coupled pivotally with respect to the first link arm 11 positioned by the main link 21. Further, the vehicular door device 20 includes an actuator 25 that drives the link mechanism 15 by applying drive force to the drive arm 23 and rotating the drive arm 23. Then, the vehicular door device 20 according to the present embodiment thereby has a configuration as a power door device 30 that can cause the door 5 to perform an opening-closing operation, based on drive force of the actuator 25.

To be specific, in the vehicular door device 20 according to the present embodiment, a coupling position of the drive arm 23 to the first link arm 11, i.e., a third rotary coupling point X3 in the first link arm 11 is set to a position nearer the first rotary coupling point X1 than the second rotary coupling point X2 (see FIGS. 3 to 5). Moreover, the actuator 25 according to the present embodiment is fixed to the vehicle body 2 at a position below the first link arm 11. Further, in the vehicle 1 according to the present embodiment, the actuator 25 is disposed at a position where an output shaft 25x is substantially coaxial with the first rotary coupling point X1. Then, the vehicular door device 20 according to the present embodiment has a configuration that couples, to the output shaft 25x of the actuator 25, one end side of the drive arm 23 disposed in parallel with the first link arm 11.

That is to say, in the vehicular door device 20 according to the present embodiment, the first link arm 11 and the second link arm 12 rotate in association with rotating of the drive arm 23, based on drive force of the actuator 25. Then, the vehicular door device 20 according to the present embodiment thereby has a configuration in which the door 5 performs an opening-closing operation, based on an operation of the link mechanism 15 formed of the first and second link arms 11 and 12.

To describe more specifically, the drive arm 23 according to the present embodiment is coupled to the output shaft 25x of the actuator 25 in such a way that a first end 23a of the drive arm 23 is incapable of relative rotation. Moreover, the drive arm 23 includes an upwardly protruding engagement protruding portion 33 provided in a second end 23b of the drive arm 23. Further, the first link arm 11 includes an engagement recessed portion 34 provided in a lower surface 11b of the first link arm 11. Then, in the vehicular door device 20 according to the present embodiment, the engagement protruding portion 33 of the drive arm 23 engages with the engagement recessed portion 34 provided in the first link arm 11, and thereby the third rotary coupling point X3 is formed.

To be specific, in the vehicular door device 20 according to the present embodiment, the engagement protruding portion 33 on the drive arm 23 side has a shaft shape, specifically, a pin shape penetrating the second end 23b of the drive arm 23. Moreover, the engagement recessed portion 34 on the first link arm 11 side is formed by attaching a bush 37 having a long hole 37x to an attachment recessed portion 36 provided in the lower surface 11b of the first link arm 11. Further, the bush 37 is formed by use of, for example, a soft material such as resin, rubber, or elastomer. Then, the vehicular door device 20 according to the present embodiment thereby has a configuration that suppresses a striking sound caused by contact between the first link arm 11 and the drive arm 23, and ensures high silence.

(Holding Structure of a Door at a Full Opened Position)

Next, a holding structure of the door 5 at a full opened position P1 mounted on the vehicular door device 20 according to the present embodiment is described.

As illustrated in FIGS. 5 to 8, the vehicular door device 20 according to the present embodiment includes an inclinable lever 40 provided at the rear edge 3r of the door opening 3. To be specific, in the vehicle 1 according to the present embodiment, a support member 42 having a support shaft 41 extending in an up-down direction (in FIG. 8, a direction orthogonal to a sheet surface) is fixed to the rear edge 3r of the door opening 3. Then, the inclinable lever 40 according to the present embodiment is pivotally supported by the support member 42 in a state where the inclinable lever 40 can rotate around the support shaft 41.

Figure 8:
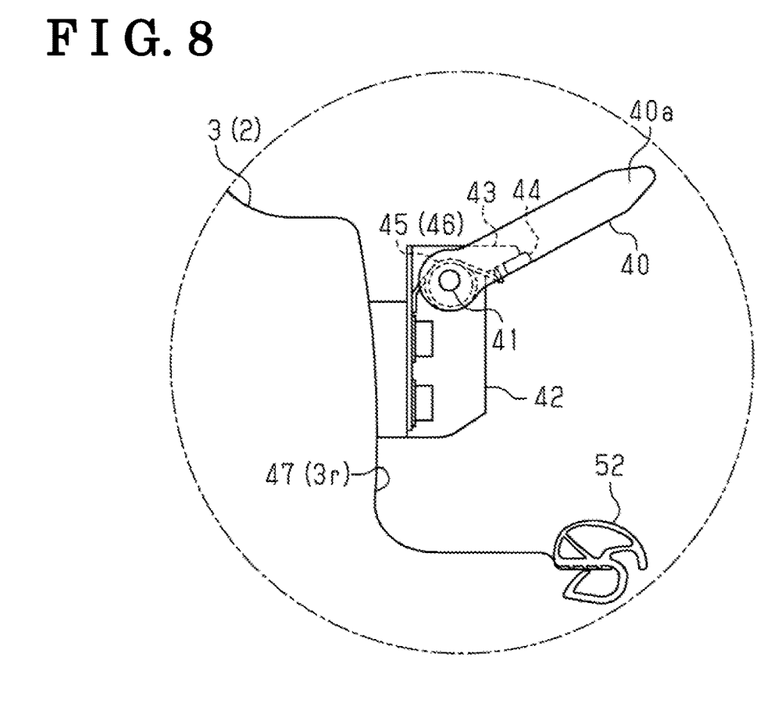
FIG. 8 is a plan view of an inclinable lever provided at an open-side end portion of a door opening.

To be specific, the inclinable lever 40 according to the present embodiment rotates in a counterclockwise direction in FIG. 8, and a tip 40a of the inclinable lever 40 moves toward an outer side (in FIG. 8, an upper side) in a vehicle width direction. Further, the inclinable lever 40 abuts against a stopper portion 43 provided in the support member 42, and thereby regulates rotating of the tip 40a in a direction toward the outer side in the vehicle width direction. Note that the inclinable lever 40 according to the present embodiment includes, on a proximal side pivotally supported by the support shaft 41, an engagement protruding portion 44 that engages with the stopper portion 43 on the support member 42 side. Then, in the vehicular door device 20 according to the present embodiment, a state where the inclinable lever 40 protrudes toward a vehicle front side (in FIG. 8, a right side) from the rear edge 3r of the door opening 3 is an erect state of the inclinable lever 40.

Furthermore, the vehicular door device 20 according to the present embodiment includes a biasing member 45 that biases the inclinable lever 40 in an erect direction, i.e., rotates and biases the inclinable lever 40 in a counterclockwise direction in FIG. 8. To be specific, the support member 42 according to the present embodiment includes a torsional coil spring 46 fitted into the support shaft 41. Then, the vehicular door device 20 according to the present embodiment is configured to use the torsional coil spring 46 for the biasing member 45, and thereby hold, based on resilient force thereof, the engagement protruding portion 44 of the inclinable lever 40 in a state of abutting against the stopper portion 43 on the support member 42 side, i.e., in an erect state.

Moreover, as illustrated in FIGS. 3 to 5, 9, and 10, in the vehicle 1 according to the present embodiment, the rear edge 3r of the door opening 3 in which the inclinable lever 40 is provided is located in a direction in which the door 5 performs an opening operation, based on an operation of the link mechanism 15 formed of the first and second link arms 11 and 12. Then, the inclinable lever 40 according to the present embodiment is disposed at a position to abut against the door 5 moving toward the full closed position P0, at the rear edge 3r serving as an open-side end portion 47 of the door opening 3.

Figure 9:
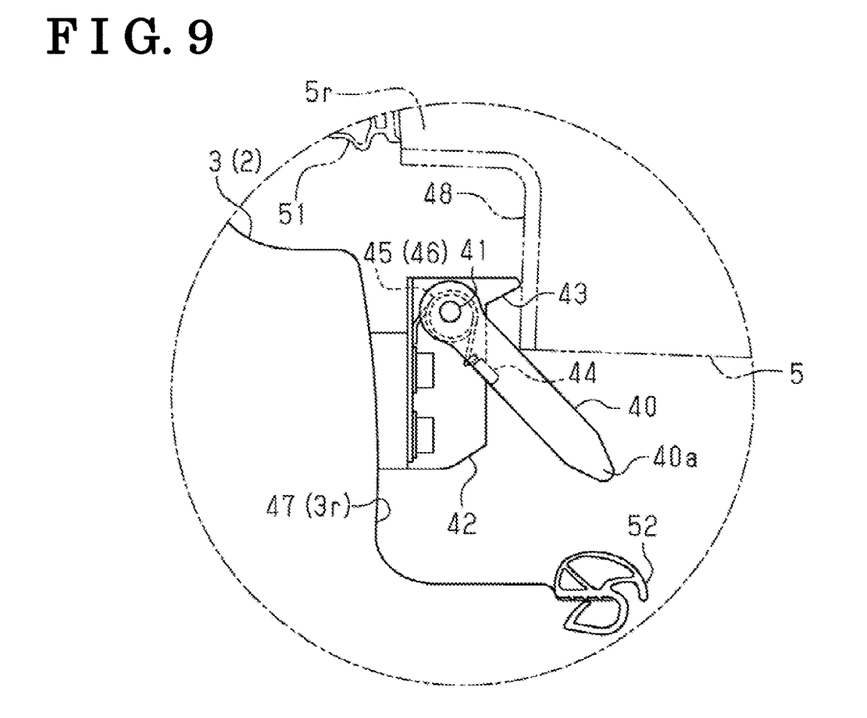
FIG. 9 is an operation explanatory view of the inclinable lever.
Figure 10:
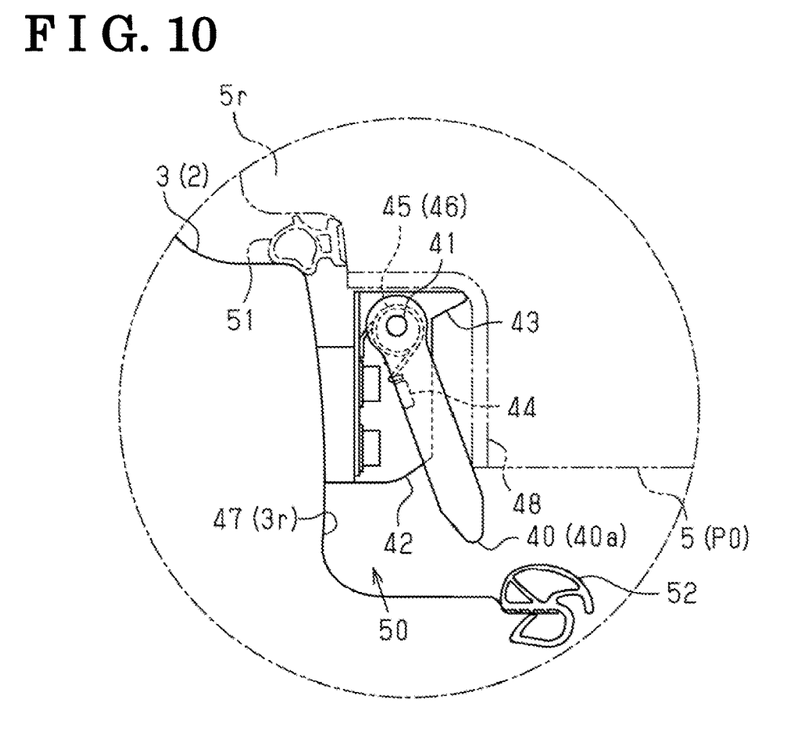
FIG. 10 is an operation explanatory view of the inclinable lever.

Furthermore, as illustrated in FIGS. 9 and 10, the inclinable lever 40 according to the present embodiment rotates in a clockwise direction in each view by being pressed by the door 5 moving toward the full closed position P0, and the tip 40a moves toward an inner side (in each view, a lower side) in a vehicle width direction. Then, the vehicular door device 20 is thereby configured in such a way that the inclinable lever 40 is brought into an inclined state of facing a vehicle front side (in each view, a right side) and being disposed along the rear edge 3r of the door opening 3.

Note that the vehicular door device 20 according to the present embodiment includes a cover member 48 provided at a rear end 5r of the door 5 that abuts against the inclinable lever 40. In the vehicular door device 20 according to the present embodiment, the cover member 48 is made by use of, for example, a relatively soft material such as resin. Then, the vehicular door device 20 according to the present embodiment is thereby configured to protect the door 5 and the inclinable lever 40.

Moreover, in the vehicle 1 according to the present embodiment, the rear end 5r of the door 5 is provided with an outer-side seal member 51 that is disposed in a clearance 50 between the rear end 5r of the door 5 and the open-side end portion 47 of the door opening 3 by movement of the door 5 to the full closed position P0. Further, the rear edge 3r of the door opening 3 serving as the open-side end portion 47 is likewise provided with an inner-side seal member 52 that is disposed, at a position closer to an inner side (in FIG. 10, a lower side) in a vehicle width direction than the outer-side seal member 51, in the clearance 50 between the rear end 5r of the door 5 and the open-side end portion 47 of the door opening 3, by movement of the door 5 to the full closed position P0. Then, in the vehicular door device 20 according to the present embodiment, the inclinable lever 40 is provided at a position between the outer-side seal member 51 and the inner-side seal member 52.

To be specific, the outer-side seal member 51 and the inner-side seal member 52 according to the present embodiment are each formed by use of, for example, a soft material such as rubber or elastomer. Moreover, the outer-side seal member 51 and the inner-side seal member 52 each extend in an up-down direction in such a way as to border the rear end 5r of the door 5 and the open-side end portion 47 of the door opening 3. That is to say, the outer-side seal member 51 and the inner-side seal member 52 are each caught in a flattened state between the rear end 5r of the door 5 and the open-side end portion 47 of the door opening 3 by movement of the door 5 to the full closed position P0. Note that, for convenience of description, illustration of an abutment portion on the door 5 side that catches the inner-side seal member 52 between the abutment portion and the open-side end portion 47 of the door opening 3 is omitted in FIG. 10. Then, the inclinable lever 40 according to the present embodiment is thereby configured to be stored inside a highly waterproof space formed between the outer-side seal member 51 and the inner-side seal member 52.

Moreover, as illustrated in FIG. 5, the vehicular door device 20 according to the present embodiment includes a check mechanism 60 that engages with the inclinable lever 40 held in an erect state as described above by movement of the door 5 to the full opened position P1.

To describe specifically, as illustrated in FIGS. 3 to 5, in the vehicular door device 20 according to the present embodiment, the check mechanism 60 is provided integrally with the first link arm 11 positioned by the main link 21. Moreover, in the vehicle 1 according to the present embodiment, the first link arm 11 is provided at a position close to the rear edge 3r of the door opening 3 serving as the open-side end portion 47, by an opening operation performed by the door 5, as described above. Further, the check mechanism 60 is fixed to the first link arm 11 at a position facing the inclinable lever 40 provided in the open-side end portion 47 of the door opening 3, by rotating in a direction causing the door 5 to perform an opening operation. Then, the vehicular door device 20 according to the present embodiment is configured to hold the door 5 at the full opened position P1, based on engagement force between the check mechanism 60 and the inclinable lever 40.

Figure 11:
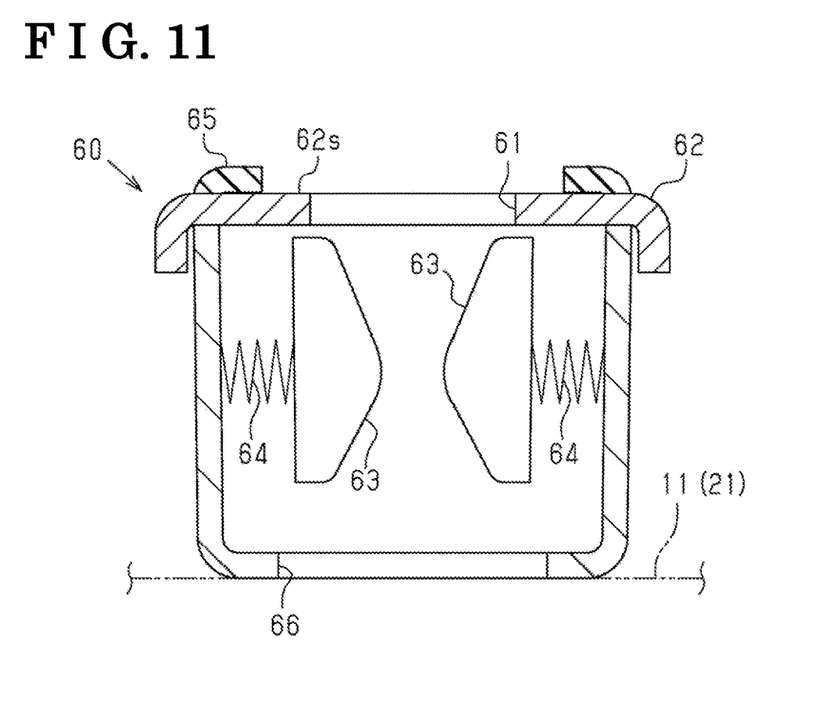
FIG. 11 is a sectional view of a check mechanism.
Figure 12:
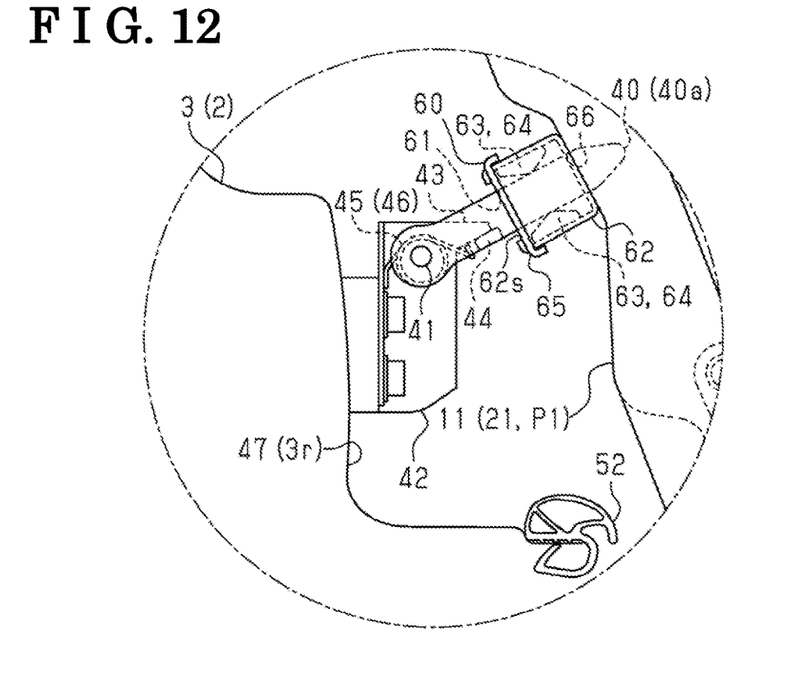
FIG. 12 is a plan view of the inclinable lever and the check mechanism that engages with the inclinable lever.

To be specific, as illustrated in FIGS. 11 and 12, the check mechanism 60 according to the present embodiment includes a substantially square-box-shaped case 62 having an insertion hole 61 into which the tip 40a of the inclinable lever 40 is inserted. Moreover, the check mechanism 60 includes a pair of engagement members 63, 63 disposed in the case 62 at positions facing each other. Further, the check mechanism 60 includes biasing members 64, 64 that bias the pair of engagement members 63, 63 in a direction where the pair of engagement members 63, 63 are brought close to each other. Note that, in the check mechanism 60 according to the present embodiment, for example, a compression coil spring or the like is used for each of the biasing members 64, 64. Then, the check mechanism 60 according to the present embodiment is configured to engage with the inclinable lever 40 in a state where the inclinable lever 40 is inserted between the pair of engagement members 63, 63 from the tip 40a side.

That is to say, in the check mechanism 60 according to the present embodiment, the inclinable lever 40 is inserted into the case 62 via the insertion hole 61 facing the open-side end portion 47 side of the door opening 3, based on rotating of the first link arm 11, by movement of the door 5 to the full opened position P1. Moreover, each of the engagement members 63, 63 is biased, in the case 62, in a direction (in FIG. 11, a left-right direction) substantially orthogonal to an insertion direction (in FIG. 11, a direction from an upper side toward a lower side) of the inclinable lever 40. Further, in the check mechanism 60, the pair of engagement members 63, 63 biased by the biasing members 64, 64 catch the inclinable lever 40 inserted in the case 62 from both sides of a width direction of the inclinable lever 40. In other words, in the vehicular door device 20 according to the present embodiment, the inclinable lever 40 inserted in the case 62 is disposed between the pair of engagement members 63, 63 in such a way that the inclinable lever 40 pushes in each of the engagement members 63, 63 against biasing force of the biasing members 64, 64. Then, the check mechanism 60 according to the present embodiment thereby has a configuration that can regulate rotating of the first link arm 11, based on engagement force between the check mechanism 60 and the inclinable lever 40 caught between the pair of engagement members 63, 63.

Note that the check mechanism 60 according to the present embodiment includes an annular cushion member 65 fixedly connected to a design surface 62s of the case 62 surrounding the insertion hole 61. In the check mechanism 60 according to the present embodiment, the cushion member 65 is formed by use of, for example, a soft material having resilience, such as rubber or elastomer. Moreover, the check mechanism 60 according to the present embodiment includes, at a position (in FIG. 11, a lower-side position) on a side opposite to the insertion hole 61, an insertion hole 66 provided in the case 62. Further, the first link arm 11 includes a non-illustrated hollow portion at a position where the check mechanism 60 is fixed. Then, the vehicular door device 20 according to the present embodiment thereby has a configuration in which the tip 40a side of the inclinable lever 40 penetrating the case 62 of the check mechanism 60 in a state of being inserted into the insertion hole 66 is disposed in the first link arm 11.

Moreover, as illustrated in FIGS. 3 to 5, in the vehicular door device 20 according to the present embodiment, force in a direction in which the door 5 performs an opening operation is applied by drive force of the actuator 25 or operational force of a user, and thereby the first link arm 11 rotates in a direction away from the open-side end portion 47 of the door opening 3. Further, thereby, the inclinable lever 40 inserted in the case 62 via the insertion hole 61 is apparently pulled out against biasing force of the biasing members 64, 64 that catches the inclinable lever 40 between the pair of engagement members 63, 63. Then, the vehicular door device 20 according to the present embodiment thereby has a configuration in which the check mechanism 60 and the inclinable lever 40 are disengaged.

Next, action of the present embodiment is described.

That is to say, the inclinable lever 40 provided in the open-side end portion 47 of the door opening 3 engages with the check mechanism 60 provided in the first link arm 11, and thereby the door 5 supported by the first link arm 11 is held at the full closed position P0. Further, the inclinable lever 40 is inclined by abutting against and being pressed by the door 5 moving toward the full closed position P0. Then, the inclinable lever 40 is stored, in a state of being inclined in this way, in the clearance 50 between the door 5 that has moved to the full closed position PO and the open-side end portion 47 of the door opening 3.

Next, effects according to the present embodiment are described.

(1) The vehicular door device 20 includes the first and second link arms 11 and 12 having the first rotary coupling point X1 with respect to the vehicle body 2, and the second rotary coupling point X2 with respect to the door 5. Moreover, the vehicular door device 20 includes the inclinable lever 40 that is provided in the open-side end portion 47 of the door opening 3 and that is opened and closed by the door 5, based on an operation of the link mechanism 15 formed of the first and second link arms 11 and 12, and the biasing member 45 that biases the inclinable lever 40 and holds the inclinable lever 40 in an erect state. Further, the vehicular door device 20 includes the check mechanism 60 that engages with the inclinable lever 40 in an erect state by movement of the door 5 to the full opened position P1, and holds the door 5 at the full opened position P1. The first link arm 11 is provided at a position close to the open-side end portion 47 of the door opening 3 by an opening operation performed by the door 5, and the check mechanism 60 is provided integrally with the first link arm 11. Then, the inclinable lever 40 is inclined by being pressed by the door 5 moving toward the full closed position P0, and is thereby stored in the clearance 50 between the door 5 and the open-side end portion 47 of the door opening 3.

According to the configuration described above, the door 5 can be stably held at the full opened position P1, based on engagement force between the inclinable lever 40 and the check mechanism 60. Further, when the door 5 is at the full closed position P0, the inclinable lever 40 is inclined, and can be thereby stored in the clearance 50 formed between the door 5 and the open-side end portion 47 of the door opening 3 even though the clearance 50 is narrow. Then, this can ensure high mountability of the inclinable lever 40.

For example, there are advantages such as a few constraints on the vehicle body 2 side, and a wide open space of the door opening 3 that can be ensured. Further, both productivity and a degree of design freedom can be achieved. Then, lower weight and lower cost can be achieved by integrating the check mechanism 60 with the first link arm 11.

(2) The check mechanism 60 includes the pair of engagement members 63, 63 disposed at positions facing each other, and biasing members 64, 64 that bias the pair of engagement members 63, 63 in a direction where the pair of engagement members 63, 63 are brought close to each other. Then, the check mechanism 60 engages with the inclinable lever 40 in a state where the inclinable lever 40 in an erect state is inserted between the pair of engagement members 63, 63.

According to the configuration described above, the check mechanism 60 that engages with the inclinable lever 40, based on rotating of the first link arm 11 moving the door 5 to the full opened position P1 can be formed. Then, the door 5 can be thereby stably held at the full opened position P1 with a simple configuration.

(3) The outer-side seal member 51 and the inner-side seal member 52 are disposed away in a vehicle width direction, in the clearance 50 between the door 5 that has moved to the full closed position PO and the open-side end portion 47 of the door opening 3. Then, the inclinable lever 40 is stored in the clearance 50 at a position between the outer-side seal member 51 and the inner-side seal member 52.

According to the configuration described above, the inclinable lever 40 can be stored in a highly waterproof space formed between the outer-side seal member 51 and the inner-side seal member 52. Then, this can ensure high reliability.

(4) The vehicular door device 20 includes the drive arm 23 having the third rotary coupling point X3 at a position between the first rotary coupling point X1 and the second rotary coupling point X2, and being coupled to the first link arm 11. Then, the vehicular door device 20 includes the actuator 25 that drives the link mechanism 15 by applying drive force to the drive arm 23 and rotating the drive arm 23.

According to the configuration described above, the power door device 30 that causes the door 5 to perform an opening-closing operation, based on drive force of the actuator 25 can be formed compactly and with a simple configuration. In addition, a degree of deposition freedom of the actuator 25 can be ensured.

Note that the embodiment described above can be modified and implemented as below. The embodiment described above and the following modified examples can be implemented in combination with each other within a technically consistent scope.

In the embodiment described above, the first link arm 11 having a configuration as the main link 21 is disposed higher than the second link arm 12 having a configuration as the sub link 22. However, without being limited to this, the second link arm 12 may be configured to be provided above the first link arm 11. Then, this disclosure may be applied to a configuration in which the first link arm 11 provided at a position near the open-side end portion 47 of the door opening 3 serves as the sub link 22, and the second link arm 12 provided at a position farther from the open-side end portion 47 of the door opening 3 serves as the main link 21.

In the embodiment described above, the check mechanism 60 includes the pair of engagement members 63, 63 disposed at positions facing each other, and the biasing members 64, 64 that bias the pair of engagement members 63, 63 in a direction where the pair of engagement members 63, 63 are brought close to each other. Then, the pair of engagement members 63, 63 and the biasing members 64, 64 are stored in the substantially square-box-shaped case 62 having an insertion hole 61 of the inclinable lever 40.

However, without being limited to this, a configuration of the check mechanism 60 may be changed to any configuration as long as the check mechanism 60 can engage with the inclinable lever 40 in an erect state and hold the door 5 at the full opened position P1. For example, a shape of the case 62 may be changed to any shape. Moreover, the check mechanism 60 may have such a configuration as to use, for an engagement member, a pair of rollers that permit insertion of the inclinable lever 40 between the rollers while rotating around a support shaft. Then, each of the biasing members 64, 64 is not limited to a compression coil spring either, and may use, for example, a leaf spring or any other spring member, or may have a configuration using a resilient member other than a spring.

A shape of the inclinable lever 40 may also be changed to any shape, for example, a shape having, at the tip 40a, such a large-diameter portion as to increase engagement force. Further, a shape of the support member 42 may also be changed to any shape. Then, the biasing member 45 of the inclinable lever 40 may not be limited to the torsional coil spring 46 either, and may use any other spring member, or may have a configuration using a resilient member other than a spring.

Figure 13:
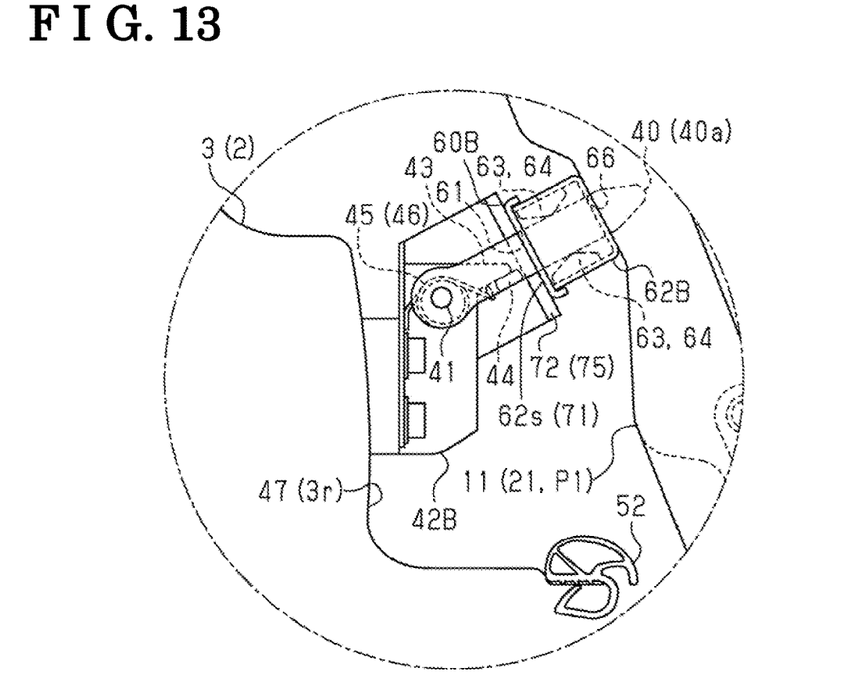
FIG. 13 is a plan view illustrating another example of the inclinable lever and the check mechanism.

As illustrated in FIG. 13, a check mechanism 60B provided in the first link arm 11 may be configured to abut against a support member 42B of the inclinable lever 40 provided at the open-side end portion 47 of the door opening 3, by movement of the door 5 to the full opened position P1. To be specific, in the example illustrated in FIG. 13, the design surface 62s of the case 62 where the insertion hole 61 of the inclinable lever 40 is provided serves as an abutment portion 71 on the check mechanism 60B side against the support member 42B of the inclinable lever 40. Then, a cushion member 75 formed by use of, for example, a soft material having resilience, such as rubber or elastomer is provided in an abutment portion 72 on the support member 42B side of the inclinable lever 40.

By adopting the configuration as described above, the check mechanism 60B and the support member 42B of the inclinable lever 40 function as a stopper portion that regulates rotating of the first link arm 11 toward an opening operation direction beyond the full opened position P1 of the door 5. Then, by interposing the cushion member 75 between the check mechanism 60B and the support member 42B of the inclinable lever 40, generation of vibration and sound by abutment of the components is suppressed, and a high sense of quality can be ensured.

Moreover, the cushion member 65 (see FIG. 11) fixedly connected to the design surface 62s of the case 62 may be configured to abut against the support member 42B of the inclinable lever 40. Further, cushion members may be configured to be provided on both the support member 42B side of the inclinable lever 40 and the check mechanism 60B side. That is to say, a cushion member may be provided in at least one of the check mechanism 60B and the support member 42B of the inclinable lever 40. Then, shapes of the abutment portion 71 on the check mechanism 60B side, and the abutment portion 72 on the support member 42B side of the inclinable lever 40 may also be changed to any shape.

In the embodiment described above, the first link arm 11 having a configuration as the main link 21 is driven by the drive arm 23 and the actuator 25. However, without being limited to this, the second link arm 12 having a configuration as the sub link 22 may be driven. Then, both of the first and second link arms 11 and 12 may be configured to be driven.

That is to say, the numbers of the drive arms 23 and the actuators 25, and depositions thereof may be changed to any number and any deposition. For example, the actuator 25 may be disposed above the first link arm 11 or below the second link arm 12. Moreover, the actuator 25 may be disposed on the door 5 side. Then, the actuators 25 may be disposed both on the vehicle body 2 side and on the door 5 side.

This disclosure is applied to a configuration in which the door 5 of the vehicle 1 performs an opening operation on a vehicle rear side in the embodiment described above, but may be applied to a configuration in which the door 5 performs an opening operation on a vehicle front side. Moreover, this disclosure may be applied to a configuration in which each support shaft N1$a$, N1$b$ and each support shaft N2$a$, N2$b$ of the first and second link arms 11 and 12 are tilted. Then, this disclosure may be applied to a manual door device having no drive source such as the actuator 25.

Next, a technical concept that can be recognized from the embodiment and modified examples described above is described.

(A) A vehicular door device, including a drive arm coupled to at least one of the first and second link arms, with a third rotary coupling point at a position between the first rotary coupling point and the second rotary coupling point, and an actuator that drives the link mechanism by applying drive force to the drive arm and rotating the drive arm.

According to the configuration described above, a power door device that causes a door to perform an opening-closing operation, based on drive force of the actuator can be formed compactly and with a simple configuration. In addition, a degree of deposition freedom of the actuator can be ensured.

A vehicular door device that solves the problem described above includes first and second link arms, an inclinable lever, a biasing member, and a check mechanism. The first and second link arms include a first rotary coupling point with respect to a vehicle body, and a second rotary coupling point with respect to a door of a vehicle. The inclinable lever is provided at an open-side end portion of a door opening opened and closed by the door, based on an operation of a link mechanism formed of the first and second link arms. The biasing member biases the inclinable lever, and holds the inclinable lever in an erect state. The check mechanism engages with the inclinable lever in the erect state by movement of the door to a full opened position, and holds the door at the full opened position. The first link arm is provided at a position close to the open-side end portion of the door opening by an opening operation performed by the door. The check mechanism is provided in the first link arm, and the inclinable lever is stored in a clearance between the door and the open-side end portion of the door opening by being pressed by the door moving to a full closed position, and inclined.

According to the configuration described above, the door can be stably held at the full opened position, based on engagement force between the inclinable lever and the check mechanism. Further, when the door is at the full closed position, the inclinable lever is inclined, and can be thereby stored in the clearance even though the clearance formed between the door and the open-side end portion of the door opening is narrow. Then, this can ensure high mountability of the inclinable lever.

In the vehicular door device that solves the problem described above, the check mechanism may include a pair of engagement members disposed at positions facing each other, and biasing members that bias the pair of engagement members in a direction where the pair of engagement members are brought close to each other, and may engage with the inclinable lever in a state where the inclinable lever is inserted between the pair of engagement members.

According to the configuration described above, the check mechanism that engages with the inclinable lever, based on rotating of the first link arm moving the door to the full opened position can be formed. Then, the door can be thereby stably held at the full opened position with a simple configuration.

In the vehicular door device that solves the problem described above, an outer-side seal member and an inner-side seal member may be disposed away in a vehicle width direction, in the clearance between the door and the open-side end portion of the door opening. Then, the inclinable lever may be stored at a position between the outer-side seal member and the inner-side seal member.

According to the configuration described above, the inclinable lever can be stored in a highly waterproof space formed between the outer-side seal member and the inner-side seal member. Then, this can ensure high reliability.

In the vehicular door device that solves the problem described above, the check mechanism may include an abutment portion, provided at the open-side end portion of the door opening, against a support member of the inclinable lever, and a cushion member may be provided in at least one of the abutment portion and the support member of the inclinable lever.

According to the configuration described above, the check mechanism and the support member of the inclinable lever function as a stopper portion that regulates rotating of the first link arm toward an opening operation direction beyond the full opened position of the door. Then, by interposing the cushion member between the check mechanism and the support member of the inclinable lever, generation of vibration and sound by abutment of the components is suppressed, and a high sense of quality can be ensured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular door device comprising:
   a first link arm and a second link arm that include a first rotary coupling point with respect to a vehicle body, and a second rotary coupling point with respect to a door of a vehicle;
   an inclinable lever provided at an open-side end portion of a door opening being opened and closed by the door, based on an operation of a link mechanism formed of the first and second link arms;
   a biasing member that biases the inclinable lever, and holds the inclinable lever in an erect state; and
   a check mechanism that engages with the inclinable lever in the erect state by movement of the door to a full opened position, and holds the door at the full opened position, wherein
   the first link arm is provided at a position close to the open-side end portion of the door opening by an opening operation performed by the door,
   the check mechanism is provided in the first link arm, and the inclinable lever is stored in a clearance between the door and the open-side end portion of the door opening by being pressed by the door moving to a full closed position, and the inclinable lever is inclined in the erect state by being released by the door moving out of the full closed position.

2. The vehicular door device according to claim 1, wherein the check mechanism includes a pair of engagement members disposed at positions facing each other, and biasing members that bias the pair of engagement members in a direction where the pair of engagement members are brought close to each other, and engages with the inclinable lever in a state where the inclinable lever is inserted between the pair of engagement members.

3. The vehicular door device according to claim 1, wherein an outer-side seal member and an inner-side seal member are disposed away in a vehicle width direction, in the clearance between the door and the open-side end portion of the door opening, and the inclinable lever is stored at a position between the outer-side seal member and the inner-side seal member.

4. The vehicular door device according to claim 1, wherein the check mechanism includes an abutment portion, provided at the open-side end portion of the door opening, against a support member of the inclinable lever, and a cushion member is provided in at least one of the abutment portion and the support member of the inclinable lever.

* * * * *